A. L. BOWER.
AUTOMATIC TRAIN CONTROLLING DEVICE.
APPLICATION FILED OCT. 15, 1913.
1,384,231.
Patented July 12, 1921.
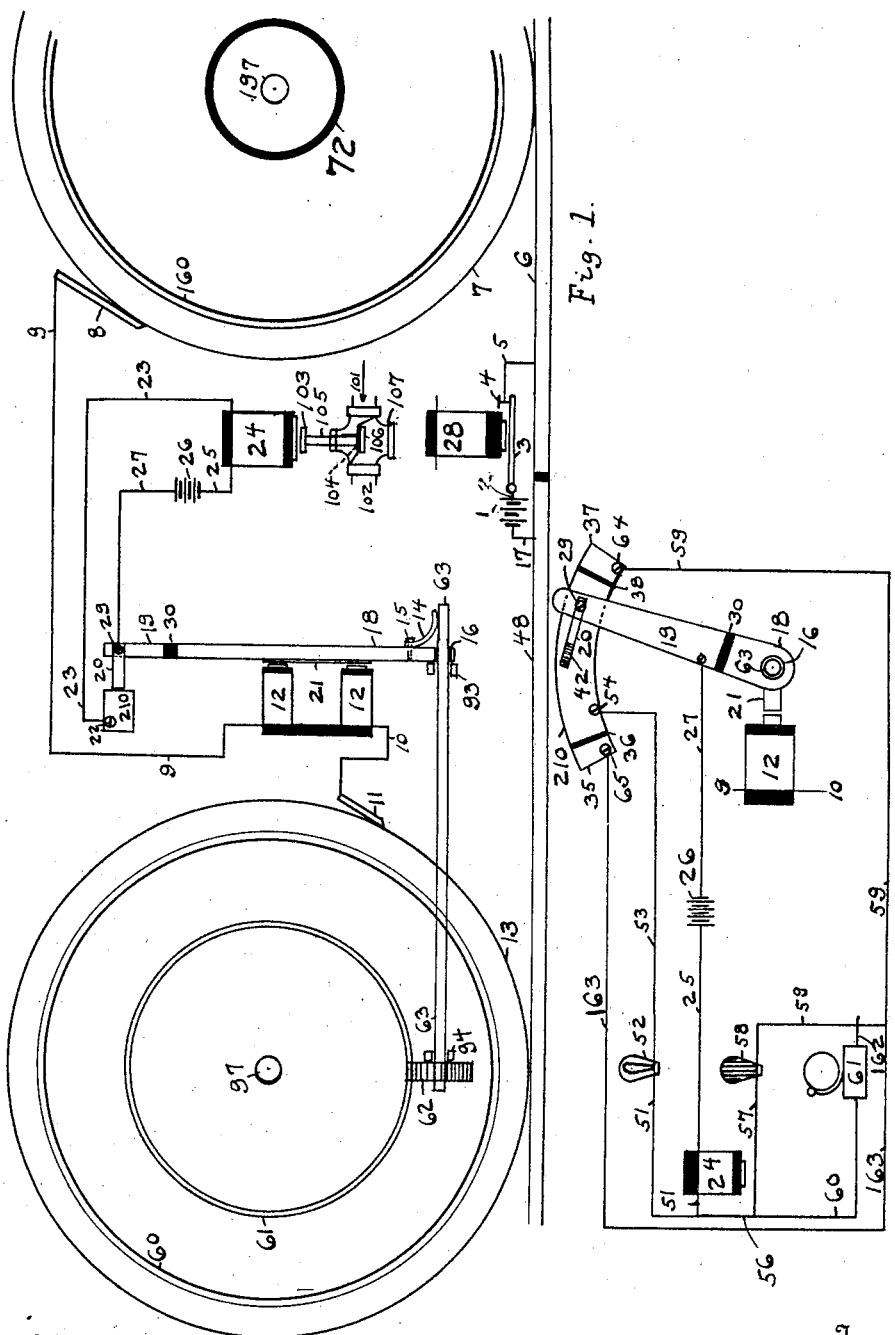
Witnesses
Inventor
A. L. Bower

UNITED STATES PATENT OFFICE.

ABRAM L. BOWER, OF BOYERTOWN, PENNSYLVANIA.

AUTOMATIC TRAIN-CONTROLLING DEVICE.

1,384,231.      Specification of Letters Patent.     Patented July 12, 1921.

Application filed October 15, 1913. Serial No. 795,301.

*To all whom it may concern:*

Be it known that I, ABRAM L. BOWER, a citizen of the United States of America, and a resident of Boyertown, in the county of Berks and State of Pennsylvania, have invented a new and useful Improvement in Automatic Train-Controlling Devices, of which the following is a specification.

This invention makes use of electric circuits and utilizes the train movement to apply the brakes automatically when the electric circuits are broken or grounded or where there is any cause for stopping the train. A signal either audible or visual, or both, is also used to notify the engine driver of the condition of track circuits and traffic ahead and of the automatic braking device.

This system is designed chiefly to provide absolute train control under all conditions of track and weather. The road is divided into blocks of approximately equal length, *e. g.*, one or two miles in length. The rails of the blocks are insulated in the usual manner and in each block, some form of insulated contact rail is used, preferably at some considerable distance from the end of the block, constituting an overlap.

In the drawings, Figure 1 shows a plan of the system and Fig. 2 shows a modification of the device used.

Two circuits, which may be termed a primary circuit and a secondary circuit are shown. For convenience, an insulated rail section 6 of the track is shown connected by a wire 5 to a contact post 4 engaged by an arm 3 which arm is connected to the main rail 48 via wires 17 and 2 and a battery 1. The arm 3 represents a switch which may be controlled by any suitable means. A third rail section may readily be substituted for the insulated rail section. I have shown a track relay 28 mounted above the switch. The arm 3, battery 1 and the rails 48 and 6 and connections constitute the stationary portion of the primary circuit. The transient portion of the primary circuit consists of a ground connection 13, an insulated wheel tire or other contact 7, a magnet 12 and connecting wires 9 and 10.

The primary circuit is traced as follows:—from battery 1, to wire 2, arm 3, contact 4, wire 5, rail section 6, tire 7, brush 8, wire 9, magnet 12, wire 10, brush 11, grounded wheel 13, rail 48 and wire 17 to the battery. As rail section 6 is short and the insulated contact 7 touches section 6 only for short intervals, the magnet 12 will be deënergized most of the time. The magnet will also be deënergized whenever relay 28 is deënergized or arm 3 drops away from the contact 4. This occurs when the block or blocks ahead are occupied.

An arm 18 with its free end 19 insulated is mounted on an axle 63 loosely enough to permit turning on the axle. A spring 14 attached to the arm presses on the axle hard enough to make the arm travel around when the axle turns. This axle is geared or connected by a suitable belt and pulleys to the car wheel 13 or its axle 97. The gears or pulleys are arranged to reduce the speed of axle 63 to about one revolution when the engine travels ten miles.

I have shown a worm gear 61 on the wheel axle 97 and this gear engages wheel 62 mounted on axle 63. The reducing gears are not all shown.

Arm 18 carries an armature 21 where the path of rotation lies very close to the pole pieces of magnet 12. When the engine travels one mile, the armature 21 travels about 36 degrees out of line with magnet 12. Should the magnet then be energized, sufficient attraction is exerted to draw and rotate the arm on axle 63 to the position shown. As long as the engine travels in one direction, the axle 63 turns in one direction but arm 18 is drawn back to the position shown whenever the insulated contact 7 strikes a charged contact rail 6.

The end 19 of arm 18 carries a spring 20 which engages a contact plate 210 connected to a magnet 24 by a wire 23. Wires 25 and 27 connect the magnet 24 through a battery 26 to spring 20. The secondary circuit is as follows:—from battery 26, to wire 27, spring 20, contact 210, wire 23, magnet 24 and wire 25 to the battery. This is the secondary circuit and it controls a brake valve 107 connected in the train line in such manner that the air pressure will open the valve if the magnet is not energized. It is preferred to have the blocks one mile long and the overlaps one fourth or one half mile long. Contact plate 210 is as long as the arc in which spring 20 travels in one mile of train movement. As long as the spring 20 and contact 210 touch, magnet 24 is energized and the brake valve is closed. Whenever a defect exists in the primary circuit or when the engine has traveled one mile beyond the last contact rail which was charged, the movement of axle 63 will carry spring 20 beyond contact 210 and the secondary circuit is broken, magnet 24 is deënergized and the brake valve opens and applies the brakes. Thus the train is brought to a stop before passing through the overlap.

In Fig. 2, contact plate 210 has two insulated extensions 35 and 37 at either end. Spring 20 has its end 42 curved so as to slide easily over the contact plate 210.

When magnet 12 is energized, the arm 18 is drawn and held in the position shown with the curved portion 42 of the spring touching the center of contact plate 210.

A white electric lamp 52 is shown included in the circuit of magnet 24. The circuit is as follows:—from battery 26, to wire 25, magnet 24, wire 51, lamp 52, wire 53, contact plate 210, spring 20, arm 19 and wire 27 to the battery.

The extensions 35 and 37 are connected together by wires 163 and 59 and to a red lamp 58 and an electric bell 61. Wires 51 and 56 are connected by wire 57 to lamp 58 and by wire 60 to bell 61.

The circuit to lamp 58 and bell 61 includes battery 26, wire 25, magnet 24, wires 51 and 56, wires 59 and 163, extension contacts 35 and 37, spring 20, arm 19 and wire 27.

The direction of train movement is immaterial. When the train has traveled nearly one mile, the end 42 of the spring 20 will slide over insulation 36 or 38 making contact with either extension contact 35 or 37 and contact plate 210 for a moment and then break contact with contact plate 210. The white lamp 52 had been supplied with current showing a clear signal but now the red lamp 58 and bell 61 are connected and the lamp lights up and the bell rings. This is the danger signal.

If the engine driver is obedient, and watchful, he will bring his train under control, otherwise the brakes will be applied as soon as the end of spring 20 passes off the side of extension contact 35 or 37 which will occur when the train has traveled a given distance unless, in the meantime, a charged rail should be met and magnet 12 should be energized, thus attracting armature 21 and drawing arm 19 to the position shown.

The plunger 103 of the brake valve may be located in such relation to arm 18 that a lateral movement corresponding to the movement necessary to break contact with contact plate 210 will strike the plunger and open the valve directly. In such case, the secondary circuit will not be needed but magnet 12 must pull hard enough to rotate arm 18 on axle 63 and yet the resistance to the turning of arm 18 on axle 63 must be greater than the force necessary to press down plunger 103.

Arm 18 may be stationary and magnet 12 and contact 210 may be carried by axle 63 if desired. The arm 18 and the gearing or other mechanism by means of which it moves away from its initial position opposite the magnet 12 when the train is running may be termed a "run-down" device. The run-down device is reset by the magnet 12, and before it can operate to exhibit a danger signal or to control the brakes, if the track ahead is clear, so that the train may continue running with safety. If, however, the track ahead is occupied, the restoring means for the run-down device will be rendered inoperative and the run-down device will continue to run down, as described, until it closes the circuit through the magnet 24 and through a danger signal such as the lamp 58 or the bell 61, and thus automatically signals the engineer or motorman that there is danger ahead. It will be apparent that the principle of the "run-down" device may be embodied in many different mechanical forms.

Cab signals such as the red lamp 58 and the bell 61, as well as brake operating means, such as the solenoid 24 and valve 104, are variously known in the art as "traffic controlling means" and "vehicle governing apparatus or means," and it will be understood that these terms as used in the present specification and claims include means for applying the brakes or for producing any danger signal in the cab.

I claim—

1. In combination, a track divided into blocks, a train carried magnet, means in each block for controlling said magnet, an arm carrying an armature adapted to be turned by the magnet, a brake valve controlled by the arm and a geared device operated by train movement, said geared device yieldingly turning said arm.

2. In combination, a track divided into blocks, a train carried magnet, means in each block for controlling said magnet, and an arm carrying armature adapted to be turned by the magnet, an electric circuit including a second magnet and controlled by the arm, a brake valve operated by the second magnet, and a train operated device constantly tending to move the arm away from the first mentioned magnet.

3. In combination, a railway track, a vehicle adapted to travel thereon, means on the vehicle driven in accordance with the movement of the vehicle along the trackway and capable of an operative condition toward which it is constantly driven, devices located at intervals in the trackway and adapted to coact with the said means to reset it away from said operative condition, and vehicle governing apparatus on the vehicle controlled by the said means, when the latter reaches said operative condition.

4. In combination, a railway track, a vehicle adapted to travel thereon, apparatus on the vehicle operatively connected with a wheel thereof to be driven constantly toward an operative condition as the vehicle proceeds along the track, devices located at intervals along the trackway and each capable of an operative and an inoperative condition, each device being adapted when operative to coact with the vehicle carried apparatus to reset the latter away from its operative condition, and vehicle governing means on the vehicle controlled by the said apparatus when the latter reaches its operative condition.

5. In combination, a railway track, a vehicle adapted to travel thereon, apparatus on the vehicle, having a controlling condition and a non-controlling condition, means operated by the vehicle for constantly changing said apparatus from non-controlling condition toward controlling condition, devices located in the trackway and adapted to initiate a movement of said apparatus away from its controlling condition, and vehicle governing means controlled by said apparatus.

6. In combination, a railway track, a vehicle adapted to travel thereon, apparatus on the vehicle capable of an inoperative condition and an operative condition and having a normal tendency to assume the latter condition, means operated in accordance with movement of the vehicle for permitting said apparatus to change toward operative condition in response to its tendency, means on the vehicle for restoring said apparatus in opposition to its normal tendency, devices located at intervals in the trackway and each adapted to cause operation of the last mentioned means, said apparatus being adapted to automatically resume its change toward operative condition after each restoration, and vehicle governing means controlled by said apparatus.

7. In combination, a railway track, a vehicle adapted to travel thereon, apparatus on the vehicle capable of an inoperative condition and an operative condition and having a normal tendency to assume the latter condition, operated in accordance with movement of the vehicle for permitting said apparatus to change toward operative condition in response to its tendency, devices located in the trackway and adapted to cooperate with said apparatus to restore the latter in opposition to its normal tendency, said apparatus being adapted to automatically resume its change toward operative condition after each restoration, and vehicle governing means controlled by said apparatus.

8. In combination, a railway vehicle, apparatus on the vehicle capable of an inoperative condition and an operative condition, means operated by the vehicle for causing said apparatus to change progressively from inoperative to operative condition in accordance with movement of the vehicle, means extraneous to the vehicle for restoring said apparatus to a condition more remote from operative condition, said apparatus being adapted to automatically resume its change toward operative condition after each restoration, and vehicle governing means controlled by said apparatus.

9. In combination, a railway vehicle, apparatus on the vehicle capable of an inoperative condition and an operative condition, and adapted to change progressively from its inoperative condition to its operative condition in accordance with the distance traveled by the vehicle, and to govern the vehicle, when said operative condition is reached, and means extraneous to the vehicle adapted to restore said apparatus from any condition of said progressive change to a condition more remote from operative condition, said apparatus being adapted to automatically resume the progressive change toward operative condition after each restoration.

10. In combination, a railway track, a vehicle adapted to travel thereon, vehicle governing means carried by the vehicle and having a retarding condition and a non-retarding condition, said means being adapted to automatically approach the retarding condition in accordance with the progress of the vehicle, and controlling means located in the trackway and adapted to coact with the vehicle governing means to reset the governing means away from retarding condition, the vehicle governing means being adapted to retard the vehicle without further extraneous control after the vehicle has progressed a given distance beyond said controlling means, said vehicle governing means being adapted to automatically resume its approach to retarding condition after each coaction with the controlling means.

11. In combination, a railway vehicle, apparatus on the vehicle capable of an inoperative condition and an operative condition and adapted to automatically change its condition by degrees progressively approaching the operative condition and to govern the vehicle when said operative condition is reached, and means extraneous to the vehicle adapted to restore said apparatus from any position or degree of said progressive change to a condition or degree more remote from operative condition, said apparatus being adapted to automatically resume the progressive change toward operative condition after each restoration.

12. In combination, a railway track, apparatus on the vehicle to govern the vehicle and having a governing and a non-governing condition, means associated with said apparatus whereby said apparatus progressively approaches its governing condition, and means extraneous to the vehicle adapted to control said means whereby the apparatus may be changed to a position more remote from its operative condition, said apparatus being adapted to automatically resume its approach to governing condition after each change by extraneous means.

13. In combination, a railway vehicle, means thereon arranged to change gradually toward an ultimate condition in accordance with the progress of the vehicle along the track, apparatus controlled by said means for governing the vehicle, and devices located in the trackway for causing said means to be restored away from said ultimate condition, said means being adapted to automatically resume its change toward ultimate condition after such restoration.

14. In combination, a railway vehicle, means thereon arranged to change gradually toward an ultimate condition in accordance with the progress of the vehicle along the track, apparatus controlled by said means for governing the vehicle, mechanism on the vehicle for restoring said means away from said ultimate condition, said means being adapted to automatically resume the change toward its ultimate condition after such restoration, and means located in the trackway for causing operation of said restoring mechanism.

15. In combination, a railway vehicle, a member thereon operatively connected with a wheel of the vehicle and arranged to move gradually toward an ultimate position in accordance with the progress of the vehicle along the track, means controlled by said member for governing the vehicle, and means located in the trackway for causing said member to be restored away from said ultimate position, said member being adapted to automatically resume movement toward its ultimate position after such restoration.

16. In combination, a railway vehicle, means thereon arranged to change gradually toward an ultimate condition, apparatus controlled by said means for governing the vehicle, and devices located in the trackway for causing said means to be restored away from said ultimate condition, said means being adapted to automatically resume its change toward said ultimate condition after such restoration.

17. In combination, a railway vehicle, means thereon arranged to change gradually toward an ultimate condition, apparatus controlled by said means for governing the vehicle, mechanism on the vehicle for restoring said means away from said ultimate condition, said means being adapted to automatically resume its change toward said ultimate condition after such restoration, and devices located in the trackway for causing operation of said restoring mechanism.

18. In combination, a railway vehicle, a member thereon arranged to move gradually toward an ultimate position, means controlled by said member for governing the vehicle, and means located in the trackway for causing said member to be restored away from said ultimate position, said member being adapted to automatically resume movement toward its ultimate position after such restoration.

19. In combination, a railway vehicle, means thereon arranged to change gradually toward an ultimate condition, an electric circuit on the vehicle, a device for automatically closing the circuit controlled by said means, and devices located in the trackway for causing said means to be restored away from said ultimate condition, said means being adapted to automatically resume its change toward said ultimate condition after such restoration.

20. A railway traffic controlling system comprising signal controlling means carried on a railway vehicle and having a proceed position and a control position, and the said means being constructed and arranged to assume the control position after a limited movement of the vehicle, and means located in the trackway and responsive to clear traffic conditions of the track in advance of the vehicle to restore the signal controlling away from control position at intervals of vehicle movement less than said limited travel after which the signal controlling would assume control position as aforesaid, thereby permitting continuous movement of the vehicle so long as clear traffic conditions prevail on the track ahead.

21. A railway traffic controlling system comprising a circuit including a source of electric current, a mechanism for controlling the display of a signal, and means for closing said circuit, the said means being constantly operated by the movement of the train to move gradually from a position where the circuit remains open to a circuit closing position during a predetermined movement of the train, and extraneous controlling means disposed at intervals along the track and responsive to clear traffic conditions of the track to reset the circuit closing means away from closing position.

22. In combination, a railway track, a vehicle adapted to travel thereon, means on the vehicle driven in accordance with the movement of the vehicle along the trackway and capable of an operative condition toward which it is constantly driven, devices located at intervals in the trackway and adapted to coact with the said means to reset it away from said operative condition, and an electric circuit on the vehicle controlled by the said means when the latter reaches said operative condition.

23. In combination, a railway vehicle, apparatus on the vehicle capable of an inoperative condition and an operative condition, means operated by the vehicle for causing said apparatus to change progressively from inoperative to operative condition in accordance with movement of the vehicle, means extraneous to the vehicle for restoring said apparatus to a condition more remote from operative condition, said apparatus being adapted to automatically resume its change toward operative condition after each restoration, and means controlled by said apparatus.

24. In combination, a railway track, a vehicle thereon, means on the vehicle arranged to change gradually toward an ultimate condition, devices actuated from an axle of the vehicle controlling such change of said means, apparatus controlled by said means for governing the vehicle, and devices located along the trackway for causing said means to be restored away from said ultimate condition, said means being adapted to automatically resume its change toward said ultimate condition as the vehicle proceeds after such restoration.

25. In combination, a railway track, a vehicle thereon, governing apparatus on the vehicle including a member adapted to move gradually from an inoperative to an operative condition, devices actuated from an axle of the vehicle controlling such gradual movement of said member, and means controlled by a track circuit and responsive to clear traffic conditions for restoring said member before it reaches operative condition, said member automatically resuming its movement toward operative condition as the vehicle proceeds after such restoration.

26. In a railway traffic controlling apparatus, a vehicle, a magnet on the vehicle, an armature for the magnet tending to move therefrom in proportion to the travel of the vehicle when the magnet is deënergized, and means for energizing the magnet periodically under clear traffic conditions.

27. In a railway traffic controlling apparatus, a vehicle, a magnet on the vehicle, an armature for the magnet tending to move therefrom when the magnet is deënergized, gearing between said armature and an axle of the vehicle controlling the movement of the armature from the magnet, and means for energizing the magnet periodically under clear traffic conditions.

In witness whereof I have signed this specification in the presence of two subscribing witnesses this 14th day of October, 1913.

ABRAM L. BOWER.

Witnesses:
MARY B. FREED,
LEWIS P. G. FEYLY.